US011996252B2

(12) United States Patent
Gerlaud et al.

(10) Patent No.: US 11,996,252 B2
(45) Date of Patent: May 28, 2024

(54) ELECTRIC CIRCUIT BREAKER

(71) Applicants: MERSEN France SB SAS, Saint-Bonnet-de-Mure (FR); ArianeGroup SAS, Les Mureaux (FR)

(72) Inventors: Antoine Gerlaud, Vaulx-en-Velin (FR); Guillaume Lemmel, Villeurbanne (FR); Jean-François Oeuvrard, Lyons (FR)

(73) Assignees: MERSEN France SB SAS, Saint-Bonnet-de-Mure (FR); Ariane Group SAS, Les Mureaux (FR)

( * ) Notice: Subject to any disclaimer, the term of this patent is extended or adjusted under 35 U.S.C. 154(b) by 271 days.

(21) Appl. No.: 17/622,769

(22) PCT Filed: Jun. 24, 2020

(86) PCT No.: PCT/EP2020/067682
§ 371 (c)(1),
(2) Date: Dec. 24, 2021

(87) PCT Pub. No.: WO2020/260382
PCT Pub. Date: Dec. 30, 2020

(65) Prior Publication Data

US 2022/0246377 A1 Aug. 4, 2022

(30) Foreign Application Priority Data

Jun. 25, 2019 (FR) ........................................ 1906892

(51) Int. Cl.
*H01H 39/00* (2006.01)
*H01H 9/10* (2006.01)
*H01H 85/02* (2006.01)

(52) U.S. Cl.
CPC .......... *H01H 39/006* (2013.01); *H01H 9/106* (2013.01); *H01H 85/0241* (2013.01); *H01H 2039/008* (2013.01)

(58) Field of Classification Search
CPC .. H01H 39/006; H01H 9/106; H01H 85/0241; H01H 2039/008
(Continued)

(56) References Cited

U.S. PATENT DOCUMENTS 3,803,374 A * 4/1974 Delgendre ........... H01H 39/004 200/61.19
3,958,206 A * 5/1976 Klint ...................... H01H 85/38 337/296

(Continued)

FOREIGN PATENT DOCUMENTS

| | | | |
|---|---|---|---|
| FR | 3051281 | A1 | 11/2017 |
| FR | 3064107 | A1 | 9/2018 |
| WO | 19081128 | A1 | 5/2019 |

OTHER PUBLICATIONS

French Patent Application No. FR 1906892, Search Report dated Apr. 1, 2020, 2 pages.

(Continued)

*Primary Examiner* — Anatoly Vortman
(74) *Attorney, Agent, or Firm* — Pearne & Gordon LLP

(57) ABSTRACT

An electric circuit breaker comprising a switch, an arc extinguishing chamber and a fuse configured to be electrically connected between first and second terminals after the switch has tripped, further comprises a connection device comprising a gate configured to be broken after the switch has tripped only when at least one of the temperature, the pressure inside the arc extinguishing chamber or the intensity of an electrical arc present in the arc extinguishing chamber passes a predefined threshold, the connection device being configured to connect an electrode of the fuse to one of the terminals of the electrical conductor only once the gate is broken.

17 Claims, 12 Drawing Sheets

(58) Field of Classification Search
USPC .................................................. 337/187, 401
See application file for complete search history.

(56) References Cited

U.S. PATENT DOCUMENTS

| | | | | | |
|---|---|---|---|---|---|
| 4,311,890 | A * | 1/1982 | Schroder | H01H 39/006 200/61.08 |
| 4,556,874 | A * | 12/1985 | Becker | H02H 3/046 340/638 |
| 5,014,036 | A * | 5/1991 | Komoto | H01H 9/102 337/403 |
| 5,783,987 | A * | 7/1998 | Kern | H01H 39/00 337/403 |
| 5,793,275 | A * | 8/1998 | Iversen | H01H 85/055 337/296 |
| 5,831,507 | A * | 11/1998 | Kasamatsu | H01H 37/76 337/5 |
| 6,194,988 | B1 * | 2/2001 | Yamaguchi | H01H 39/006 200/61.08 |
| 6,556,119 | B1 * | 4/2003 | Lell | H01H 37/323 337/182 |
| 7,205,879 | B2 * | 4/2007 | Kordel | H01H 39/006 337/401 |
| 7,239,225 | B2 * | 7/2007 | Tirmizi | H01H 39/006 337/30 |
| 7,498,923 | B2 * | 3/2009 | Iversen | H01H 39/006 337/296 |
| 7,875,997 | B2 * | 1/2011 | George | H01H 9/106 307/117 |
| 8,432,246 | B2 * | 4/2013 | Suzuki | B60L 3/04 361/115 |
| 10,276,314 | B2 * | 4/2019 | Minke | H01H 50/546 |
| 10,661,656 | B2 * | 5/2020 | Hammerschmidt | H01H 39/006 |
| 11,201,027 | B2 * | 12/2021 | Ehrhardt | H01H 89/00 |
| 2003/0076215 | A1 * | 4/2003 | Baghdasarian | B64G 1/222 337/140 |
| 2004/0041682 | A1 * | 3/2004 | Pasha | H01H 39/006 337/401 |
| 2006/0145808 | A1 * | 7/2006 | Von Behr | H01H 39/006 337/401 |
| 2008/0137253 | A1 * | 6/2008 | George | H01H 39/006 29/428 |
| 2013/0009745 | A1 * | 1/2013 | Hentschel | H01H 39/006 337/401 |
| 2019/0371561 | A1 * | 12/2019 | Ehrhardt | H01H 39/006 |
| 2020/0211801 | A1 * | 7/2020 | Lell | H01H 9/02 |

OTHER PUBLICATIONS

International Application No. PCT/EP2020/067682, International Search Report and Written Opinion, dated Jul. 14, 2020, 11 pages.

* cited by examiner

ELECTRIC CIRCUIT BREAKER

CROSS-REFERENCE TO RELATED APPLICATIONS

This application is a national stage filing of International Application No. PCT/EP2020/067682, filed Jun. 24, 2020, which claims priority to French Application No. 1906892 filed Jun. 25, 2019. The entire disclosures of the aforementioned patent applications are incorporated herein by reference.

TECHNICAL FIELD

The present invention relates to an electric circuit breaker.

BACKGROUND

In the field of electrical protection, electric circuit breakers make it possible to interrupt an electric current, for example to disconnect an electric charge from an electric circuit in response to a cutoff order.

In some applications, in particular those related to photovoltaic panels or to battery-powered electric vehicles, it is sometimes necessary to interrupt an electric current with a very short response time (e.g. in less than 10 ms).

Ideally, such a circuit breaker must have a very wide operating range, that is to say, it must be capable of interrupting low-intensity electric currents (e.g. less than 100 A under 1000 V DC), or even opening a circuit in the absence of current, as well as interrupting high-intensity electric currents (e.g. up to 30 kA), whether in electric circuits with very low inductance (e.g. 3 pH or less) or in electric circuits with high inductance (e.g. 100 pH or more).

It is known from FR-3064107-A1 to use a single-use circuit breaker formed by associating a pyrotechnic switch with an external fuse, in which the pyrotechnic switch is tripped to physically section an electrical conductor connecting input and output terminals of the circuit breaker and in which the electrodes of the external fuse are automatically connected to the sectioned conductor once the switch has been tripped. This connection deviates the current toward the fuse and the latter will next melt to interrupt the current.

Such a circuit breaker has the drawback, however, of having an excessively reduced operating range, since it is not possible to optimize the fuse both to interrupt low-intensity currents and high-intensity currents.

In practice, with low-intensity currents (e.g. intensity less than 10 times the caliber of the fuse), the fuse takes too long to melt completely, in particular since the pre-arcing time of the fuse depends on the intensity of the current to be interrupted.

Thus, if the fuse is sized for high-intensity currents, it will take longer to melt completely when it is passed through by low-intensity currents. Throughout this time, the current will continue to flow inside the pyrotechnic switch and the electric charge will continue to be supplied, despite the cutoff order.

If no current flows in the circuit breaker when it is tripped, the fuse will remain intact. A current much lower than the caliber of the fuse can therefore continue to flow in the circuit breaker without any limit in time. This is not desirable, since the function requested from the circuit breaker is to open the electric circuit in all cases, independently of the value of the current passing through it at the tripping instant.

If, on the contrary, the fuse is dimensioned for low-intensity currents, there is a risk that the fuse will melt too quickly when it is passed through by high-intensity currents, which will not allow the gases present in the switch to cool and to deionize, which can lead to the reestablishment of an electrical arc between the sectioned portions of the conductor in the pyrotechnic switch. The current then can no longer be interrupted, which may damage the electric charge and/or the circuit breaker itself, to the point of leading to destruction of the circuit breaker.

There is therefore a need for an electric circuit breaker capable of interrupting an electric current with a very short response time and with a wide operating range, from a zero-intensity current to a very high-intensity current.

SUMMARY

To this end, according to one aspect of the invention, an electric circuit breaker includes:

- an electrical conductor comprising a first terminal and a second terminal;
- a switch configured to separate the first terminal from the second terminal when it is tripped in response to a current cutoff order;
- an arc extinguishing chamber delimited by a body of the circuit breaker, the arc extinction chamber being configured to receive, after the pyrotechnic switch is tripped, a portion of the electrical conductor separated at least from the first terminal or the second terminal;
- a fuse configured to be electrically connected between the first and second terminals after the switch is tripped;
- the circuit breaker includes a connection device comprising a gate configured to be broken after the switch is tripped only when at least one of the temperature, or the pressure inside the arc extinguishing chamber, or the intensity of an electrical arc present in the arc extinguishing chamber passes a predefined threshold, the connection device being configured to connect an electrode of the fuse to one of the terminals of the electrical conductor only once the gate is broken.

The association between the fuse and the device allows a fast response and a wide operating range to be obtained.

The gate allows a threshold to be introduced past which the current is deviated toward the fuse. The threshold required to break the gate and thus to connect the fuse depends indirectly on the intensity of the electric current to be interrupted and can be controlled by choosing certain characteristics of the gate during the manufacture of the circuit breaker.

Thus, the threshold past which the fuse is connected after the switch is tripped adapts automatically based on the conditions that prevail inside the arc extinguishing chamber. Owing to this adaptation, for currents of intensity below the defined threshold, the switch opens the circuit without intervention by the fuse; for currents of intensity above the defined threshold, the fuse is connected in parallel with the switch. The time then needed for the fuse to melt (pre-arcing time) allows the cooling and deionization of the gases present in the cutoff chamber of the switch. When the fuse has melted, an electrical arc appears and becomes larger within it, which makes it possible to interrupt the passage of the current. Owing to this adaptation, the same fuse can be used to interrupt both high-intensity and low-intensity currents.

According to advantageous but optional aspects, such an electric circuit breaker may incorporate one or more of the following features, considered alone or according to any technically allowable combination:

At least one electrode of the fuse extends inside the arc extinguishing chamber, the gate being an electrically insulating gate that separates said at least one electrode from the rest of the arc extinguishing chamber.

The insulating gate includes a wall that delimits a volume around said at least one electrode of the fuse in the arc extinguishing chamber.

The wall is electrically insulating.

The wall is configured to melt when the temperature in the arc extinguishing chamber passes a predefined threshold.

The wall includes a precut area configured to detach and to form an opening in the wall when the pressure in the arc extinguishing chamber passes a predefined threshold.

The insulating gate includes an electrically insulating coating deposited on said at least one electrode of the fuse in the arc extinguishing chamber, this coating being configured to melt when the temperature in the arc extinguishing chamber passes a predefined threshold.

The wall or the coating is covered with at least one electrically conductive outer layer.

The wall is made from metal.

The wall is configured to deform when the pressure in the arc extinguishing chamber passes a predefined threshold, until it comes into contact against the free end of said at least one electrode.

The free end of said at least one electrode is configured to perforate the wall when the wall deforms and comes into contact with said free end.

The wall includes a precut area configured to detach and to form an opening in the wall when the pressure in the arc extinguishing chamber passes a predefined threshold.

The circuit breaker includes a control circuit, a sensor for measuring a condition inside the arc extinguishing chamber and an auxiliary actuator configured to break the insulating gate and in which the control circuit is configured to trip the auxiliary actuator when a physical property measured by the sensor passes a threshold value.

The circuit breaker includes an additional fuse configured to be electrically connected between the first and second terminals after the switch is tripped, at least one electrode of the additional fuse extending inside the arc extinguishing chamber, the circuit breaker further including an electrically insulating additional gate that separates said electrode of the additional fuse from the rest of the arc extinguishing chamber, said gate being configured to be broken after the switch is tripped only when at least one of the temperature, or the pressure inside the arc extinguishing chamber, or the intensity of an electrical arc present in the arc extinguishing chamber passes a predefined threshold, this threshold being different from the tripping threshold associated with the insulating gate of the other fuse.

The circuit breaker includes an additional electrical conductor connected to one of the terminals of the electrical conductor, the additional electrical conductor being insulated from the arc extinguishing chamber and including a free end that opens to the inside of the volume delimited by the wall.

The connection device includes an electrically conductive movable part that is movable between an idle position and an excited position in which it electrically connects said electrode of the fuse with said terminal, the movable part being mounted sliding in a housing of the circuit breaker, the gate being arranged so as to separate the arc extinguishing chamber from the housing and being configured to break when the predefined threshold is passed.

The switch is a pyrotechnic switch.

BRIEF DESCRIPTION OF THE DRAWINGS

The invention will be better understood, and other advantages thereof will appear more clearly, in light of the following description of an embodiment of an electric circuit breaker provided solely as a non-limiting example and done in reference to the appended drawings, in which.

DETAILED DESCRIPTION OF SOME EMBODIMENTS

Figure 1:
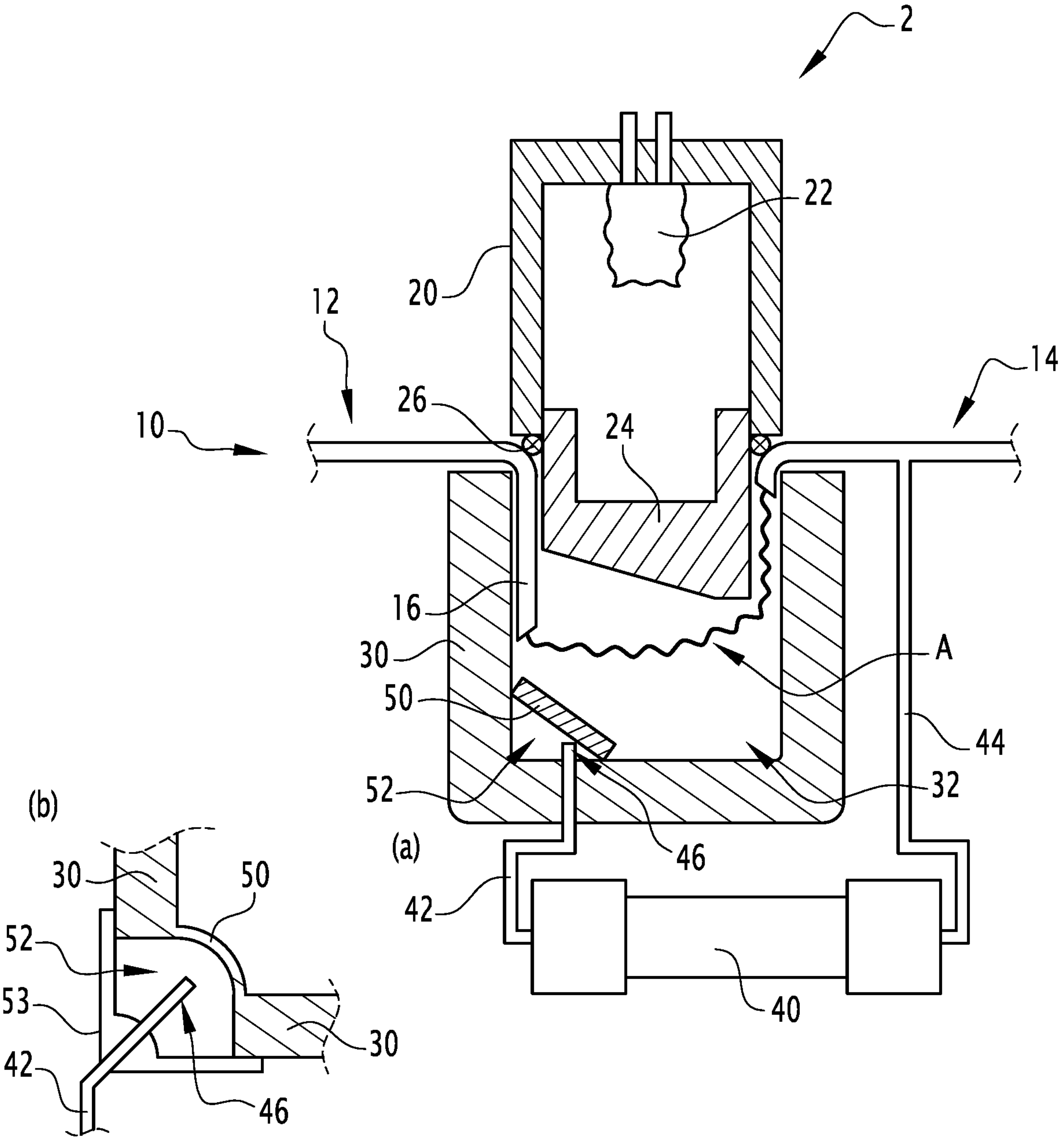
FIG. 1 is a schematic illustration, in sectional view, of an electric circuit breaker according to a first embodiment of the invention, illustrated in a first state.
Figure 2:
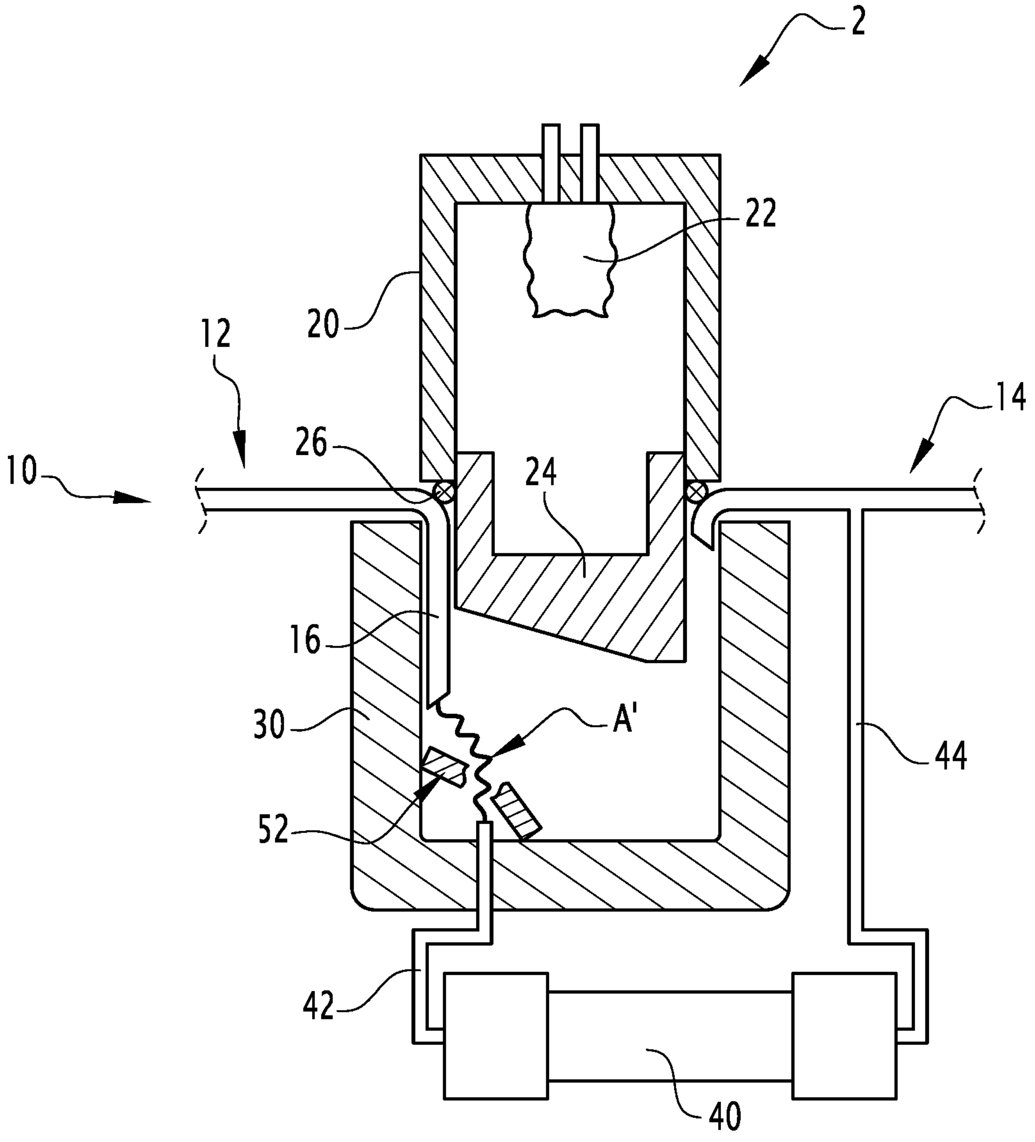
FIG. 2 is a schematic illustration of the electric circuit breaker of FIG. 1, illustrated in a second state.

FIGS. 1 and 2 show an electric circuit breaker 2.

The circuit breaker 2 is able to be used in an electrical system for protecting an electric charge connected to an electrical power source.

For example, the circuit breaker 2 is more particularly configured to disconnect an electric charge in response to a control order, for example when an electric fault is detected in the electrical system.

According to non-limiting examples, the circuit breaker 2 can be used to protect a battery of electrochemical cells or a photovoltaic panel.

For example, the control order can be supplied automatically by a trip unit, or by an electronic control system, or manually by an operator.

The circuit breaker 2 includes an electrical conductor 10 comprising a first terminal 12 and a second terminal 14, which respectively form input and output terminals of the circuit breaker 2. For example, the conductor 10 is a bar or strip of metal material, such as copper.

The circuit breaker 2 can be switched from a first state, also called "closed state" or "armed state," to a second state, also called "open state" or "tripped state."

In the closed state, the circuit breaker 2 allows an electric current to flow through the electrical conductor 10. For example, the first terminal 12 and the second terminal 14 are electrically connected by a main part 16 of the conductor 10.

In the open state, the electrical conductor 10 is sectioned to separate the first terminal 12 from the second terminal 14 and thus to interrupt the electric current.

The circuit breaker 2 also includes a switch 20.

According to preferred embodiments, described and illustrated hereinafter as examples, the switch 20 is a pyrotechnic switch including a pyrotechnic actuator 22 and a cutoff member 24, which are housed in a first part of a casing of the circuit breaker 2.

The cutoff member 24 is configured to separate the first terminal 12 from the second terminal 14 in response to the activation of the actuator 22.

The member 24 for example includes a sharp element, such as a blade or a guillotine or a punch, configured to cut the conductor 10, or a movable body configured to push a precut or weakened portion of the conductor 10.

The cutoff member 24 is movable by translation between a retracted position and a deployed position. In the figures, the cutoff member 24 is only visible in its deployed position.

The actuator 22 includes a pyrotechnic charge that can be tripped owing to the application of a control signal and the operation of which propels the cutoff member 24 toward its deployed position to section the conductor 10.

A seal 26 or another sealing means can be borne by the cutoff member 24 in order to hermetically close the first casing part.

In alternative embodiments, the switch 20 can be an electromechanical electrical switching device, for example including movable parts such as separable electrical contacts that can be actuated using an actuating mechanism. These movable parts then replace the cutoff member 24 and the portion 16 of the electrical conductor 10.

Everything described hereinafter in reference to the pyrotechnic switch 20 is applicable, mutatis mutandis, to such alternative embodiments.

The circuit breaker 2 also includes an arc extinguishing chamber 32 partially delimited by a second part 30 of the casing of the circuit breaker 2.

The chamber 32 is associated with the electrical conductor 10 and participates in interrupting the electric current between the first terminal 12 and the second terminal 14 when the circuit breaker 2 is switched from the closed state to the open state.

In the open state, the main portion 16 is separated at least from the first terminal 12 or from the second terminal 14 and is at least partially inside the chamber 32. For example, like in the example of FIG. 1, the part 16 is detached from the terminal 14 but remains attached to the terminal 12. In a variant, the part 16 could be completely separated from both terminals 12 and 14.

According to examples of construction, illustrated in FIGS. 1 and 2, the first and second casing parts are joined and aligned along a first direction, for example a vertical direction, and the conductor 10 extends along a second direction perpendicular to the first direction, for example along a horizontal direction. Other configurations can, however, be used as a variant.

For example, the casing is made from an electrically insulating material, such as a polymer.

In practice, when the conductor 10 is sectioned while an electric current is flowing therein, an electrical arc (denoted A) forms in the chamber 32 between the two sectioned ends of the conductor 10, for example between the free end of the main part 16 and the cut end of the conductor 10 that remains connected to the terminal 14.

As long as the electrical arc A remains present, the electric current continues to flow between the terminals 12 and 14. It will therefore be understood that the electrical arc A must be extinguished in order for the electric current to be effectively interrupted by the circuit breaker 2.

The circuit breaker 2 further includes a fuse 40 arranged to be electrically connected in series between the first terminal 12 and the second terminal 14 after the switch is tripped, as explained in more detail hereinafter. In the closed state, the fuse 40 remains disconnected from the terminal 12. In the illustrated example, the other end of the fuse 40 remains continuously connected to the terminal 14.

The fuse 40 includes at least one electrode 42 extending inside the inner volume defined by the casing part 30 delimiting the extinguishing chamber 32.

A second electrode 44 of the fuse 40 is connected to one of the terminals 12 or 14 of the conductor.

The free end of the electrode 42 protruding in the chamber 32 here bears reference 46. The free end 46 corresponds to the portion of the electrode 42 that is inside the chamber 32.

The connection of the fuse 40 to the other terminal of the conductor 10 therefore can only be done by means of the extinguishing chamber 32, either by placing the electrode 42 in direct contact with said terminal, or by means of an electrical arc A' between said terminal 12 and the electrode 42.

In general, a "fuse" here refers to any component, such as a dipole, capable of dissipating energy to interrupt an electric current passing through it. According to one example, the fuse 40 can include at least one fuse link arranged in a fuse body.

The circuit breaker 2 further includes a connection device comprising an electrically insulating gate that separates said at least one electrode 42 from the rest of the arc extinguishing chamber 32.

According to embodiments like that illustrated in insert (a) of FIG. 1, the electrically insulating gate includes a wall 50 that delimits a closed volume 52 within the extinguishing chamber 32. The volume 52 is filled with an electrically insulating medium, such as air or vacuum. The gate can, however, be made differently.

Advantageously, the gate is configured to be broken after the switch 22 is tripped only when at least one of the temperature or the pressure inside the arc extinguishing chamber 32, or the intensity of an electrical arc present in the arc extinguishing chamber 32, passes a predefined threshold.

In other words, as long as the gate has not been broken, it prevents the fuse 40 from being connected to the terminal 10 even when the switch 22 has tripped and the circuit breaker 2 is no longer in the closed state. The electrical arc A can therefore be maintained between the terminals 12 and 14. The current to be interrupted does not enter the fuse 40.

The electrode 42 can only be connected to the conductor 10 (in the case at hand, to the terminal 12 in the example of FIG. 2) once the gate is broken, in particular under the direct or indirect effect of the electrical arc A, for example due to heating and/or erosion and/or the pressure increase of the ionized gases generated by the electrical arc A.

Preferably, as illustrated in FIG. 2, once the gate is broken, the electrical arc A disappears and the connection is then made by means of a second electrical arc A' established between the electrode 42 and the end 16 of the terminal 12. In other words, the connection device is configured to connect the electrode 42 to the terminal 12 only once the gate is broken.

This connection device, implemented by the insulating gate in the illustrated embodiments, allows a lag (a delay) to be introduced between the instant where the actuating device is tripped and the instant where the current to be interrupted is deviated toward the fuse 40. The value of this delay can be at least partially controlled by choosing construction parameters of the gate. In the remainder of this description, this delay may be called "threshold."

The threshold required to break the gate and thus to connect the fuse 40 depends indirectly on the intensity of the electric current to be interrupted and can be controlled by choosing certain characteristics of the gate, such as the melting or sublimation temperature of the material used to form the wall 50 and/or the mechanical strength of the wall 50 and/or dimensional characteristics of the wall 50 and/or of the volume 52.

This makes it possible to guarantee that the gate will be broken when the physical conditions in the chamber 32 (conditions characterized by at least one of the following physical properties: the temperature in the chamber 32, the pressure in the chamber 32, the intensity of the electrical arc A) have reached a predefined threshold.

Thus, the threshold past which the fuse is connected after the pyrotechnic device is tripped adapts automatically based on the conditions that prevail inside the arc extinguishing chamber. Owing to this adaptation, the same fuse can be used to interrupt both high-intensity and low-intensity currents.

For example, if the intensity of the current to be interrupted is zero or low, the threshold from which the fuse is connected is not reached. The switch operates alone; the fuse is never connected to the terminal 12. This allows a fast interruption time of the electric current to be obtained.

For example, if the intensity of the current to be interrupted is high, the threshold from which the fuse is connected is passed. The fuse is then sized to have a long enough pre-arcing time, so as to allow the gases of the chamber 32 to cool and to deionize.

As will be explained through the examples below, the wall 50 can be a fuse wall that is destroyed by melting or sublimation beyond a predefined temperature, or a wall that deforms or breaks past a predefined pressure.

According to embodiments, the wall 50 is made from an electrically insulating material. The wall 50 therefore electrically insulates the electrode 42 (for example, at least the portion of the electrode 42 that is inside the chamber 32) from the rest of the chamber 32. The insulating properties of the gate are therefore due to the insulating properties of the gate 50, although the volume 52 of air or vacuum can also participate in this insulation. The volume 52 can, however, be omitted when the wall 50 is insulating enough.

In other embodiments, the electrical insulation properties of the gate come from electrically insulating properties of the volume 52 of air or vacuum, the wall 50 then only serving to contain this volume 52 and to keep it separated from the rest of the extinguishing chamber 32 until the wall 50 is broken.

In such a case, the wall 50 can be made from an electrically conductive material, for example metal, the volume 52 being sized by itself to electrically insulate the electrode 42 from the rest of the chamber 32 and from the wall 50. The placement in contact of the electrode 42 is ensured not by breaking the wall 50, but by deforming the wall 50 until it comes into direct contact with the end 46 of the electrode 42 so as to be electrically in contact with the latter. An electrical connection between the fuse 40 and the conductor 10 can then be established by the electrical arc A' that is established between the wall 50 and the terminal 16.

According to examples, the fuse wall 50 is made from polymer, for example polyamide or polypropylene or polyimide, or from elastomer, or from polyester, or from silicone, these materials being able to include a mineral filler such as glass fibers or graphene.

According to examples provided as an illustration, the polymide [sic] wall may have a thickness of less than 300 μm, or less than 100 μm, or less than 50 μm. The polypropylene wall may have a thickness of less than 450 μm, or less than 300 μm, or less than 100 μm.

In the example illustrated in insert (a) of FIG. 1, the wall 50 is attached to the inside of the chamber 32.

However, in a variant, the wall 50 can be formed in a single piece with the walls of the second casing part 30, as illustrated in insert (b) of FIG. 1, the exact shape of the wall 50 illustrated in this figure not necessarily being limiting. This simplifies the manufacturing method, since the wall 50 can be manufactured at the same time as the rest of the casing 30, for example by molding. For example, an attached bottom wall 53 can be used to close the rear of the housing 52.

According to embodiments provided as an example, the walls of the second casing part 30 can include a housing that opens into the chamber 32 and in which the end 46 of the electrode 42 is arranged. The wall 50 is arranged in the opening of the housing so as to close this housing.

The dimensions of the wall 50, and in particular its thickness, depend on the material chosen and on the threshold value selected for the temperature or for the pressure.

According to a non-limiting example given as an example, the wall 50 has a thickness of less than 0.5 mm or less than 0.1 mm. Here, the volume 52 has a cylindrical shape with a diameter equal to 3 mm and a height equal to 2 mm.

For example, the volume 52 is less than or equal to 50 $mm^3$.

In a variant, the wall 50 can be replaced by a separating element that does not necessarily take the form of a plate, such as a separating membrane, or one or several sealing gaskets.

According to other embodiments of the invention that are not illustrated in the figures, when the wall 50 is formed from an electrically insulating material, it may be covered by an electrically conductive coating on its outer face, that is to say, its face that is directly exposed toward the chamber 32. This conductive coating makes it possible to attract the electrical arc A as close as possible to the wall 50, which allows the degradation speed of the wall 50 to be accelerated.

Figure 3:
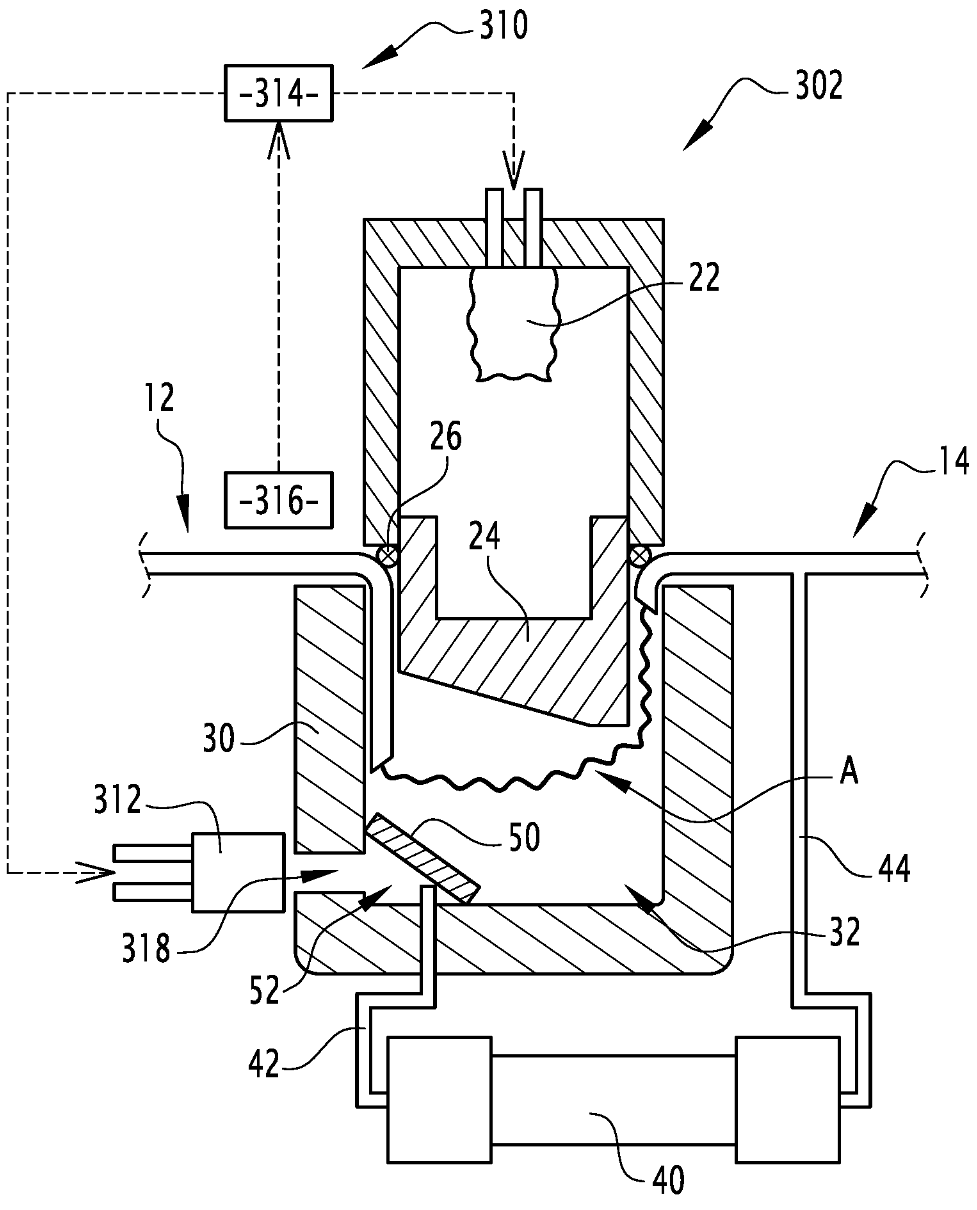
FIG. 3 is a schematic illustration, in sectional view, of an electric circuit breaker according to a second embodiment of the invention.

FIG. 3 shows a circuit breaker 302 according to another embodiment of the invention.

The circuit breaker 302 is similar to the circuit breaker 2, except that it further includes a control circuit 310 and a second actuator 312, arranged to break the insulating gate in response to a control signal emitted by the control circuit 310.

In the illustrated embodiment, the actuator 312 is a pyrotechnic actuator, similar to the actuator 22. In a variant, the actuator 312 can be an electromagnetic actuator or a piezoelectric actuator or use any other appropriate motor means to break the gate 50.

The control circuit 310 includes an electronic processing unit 314 (e.g. a processor, such as a microcontroller) and a sensor 316 to measure at least one physical property relative to a condition inside the chamber 32.

The circuit 310 is configured to trip the second pyrotechnic actuator 312 so as to break said gate when said measured condition passes a predefined threshold. For example, the condition is a temperature in the chamber 32, or a pressure in the chamber 32, or the intensity of the current flowing in the conductor 10.

In the illustrated example, the sensor 316 is configured to measure the current that flows in the conductor 10 when the electrical arc A is established across the terminals 12 and 14. When the measured current passes the predefined threshold value, the second actuator 312 is tripped.

According to one example, the second actuator 312 is arranged outside the chamber 32 while being placed opposite the wall 50 owing to an opening 318 arranged in the casing part 30. When the pyrotechnic charge is ignited following the activation of the actuator 32, the pressure wave created by the operation of the pyrotechnic charge is at least partially channeled through the passage 318 and reaches the wall 50, causing it to break and opening an electrical conduction path between the electrode 42 and the conductor 10.

Aside from these differences, the description of the circuit breaker 2 is applicable to the circuit breaker 302.

Figure 4:
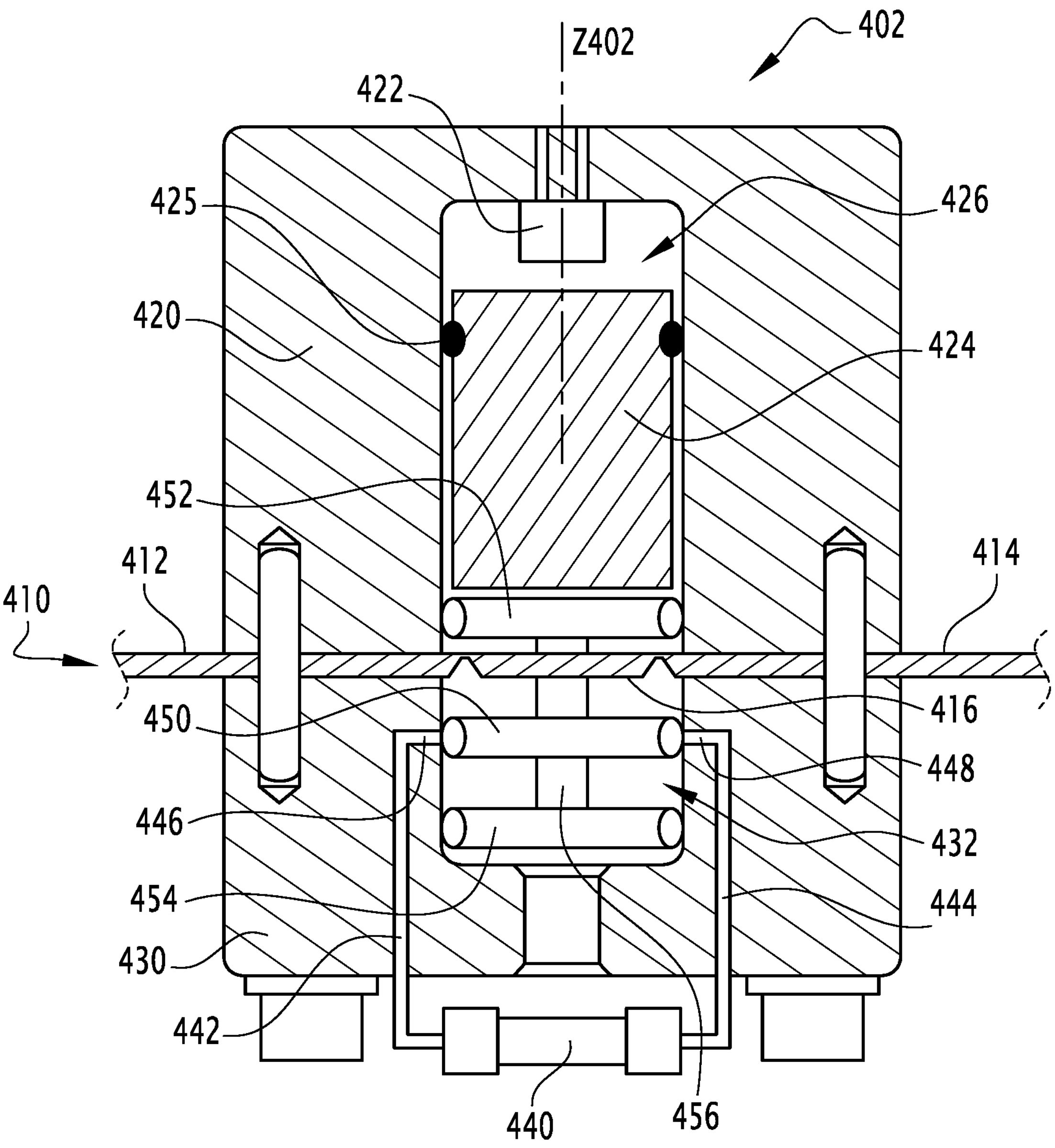
FIG. 4 is a schematic illustration, in sectional view, of an electric circuit breaker according to a third embodiment of the invention.
Figure 5:
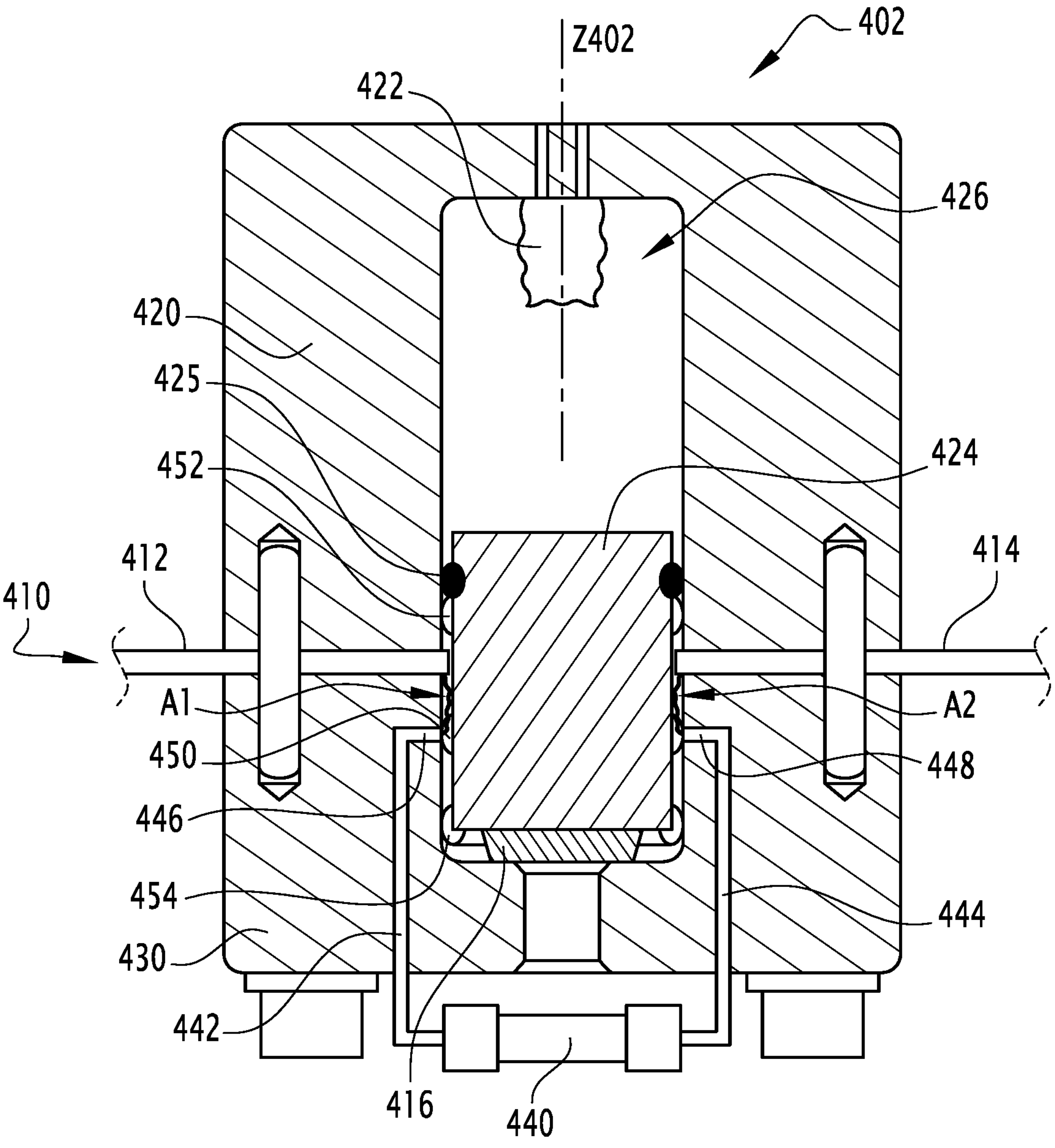
FIG. 5 is a schematic illustration, in sectional view, of the circuit breaker of FIG. 4, illustrated in a second state.

FIGS. 4 and 5 show a circuit breaker 402 according to another embodiment of the invention. The circuit breaker 402 is illustrated in its closed state in FIG. 4 and in its open state in FIG. 5.

The circuit breaker 402 is functionally similar to the circuit breaker 2, but differs from the latter by certain details of construction and in particular by how the insulating gate of the connection device is constructed.

The elements of the circuit breaker 402 that are similar to those of the circuit breaker 2 or that play a role similar to the latter bear the same numerical reference as the latter, increased by the quantity "400." For example, the fuse 440 is similar to the fuse 40. The description of these elements provided above in reference to the embodiments of the circuit breaker 2 can be transposed to the circuit breaker 402.

In the circuit breaker 402, the conductor 410 assumes the form of a blade or strip comprising terminals 412 and 414 connected to one another by the central part 416, the latter being able to be precut or weakened relative to the terminals 412 and 414.

The circuit breaker 402 includes a body (a casing) in the form of a cylinder with axis Z402. The first part 420 of the casing includes walls that delimit a central housing 426 centered on the axis Z402 and in which are arranged the pyrotechnic charge 422 of the pyrotechnic switch and a movable body 424 able to move by translation in the housing 426 along the axis Z426.

The arc extinguishing chamber 432 is delimited by the walls of the second part 430 of the casing and extends in the extension of the central housing 426.

For example, the housing 426, the chamber 432 and the movable body 424 have a cylindrical shape.

As long as the circuit breaker 402 is in the closed state, the central part 416 of the conductor 410 extends through the housing 426, perpendicular to the direction Z402.

The fuse 440 includes a first electrode 442 and a second electrode 444, which are partially inserted into the walls of the second casing part 430 and which open into the extinguishing chamber 432 by ends 446 and 448, respectively. For example, the ends 446 and 448 are arranged facing one another.

The insulating gate includes an O-ring 450 arranged in the chamber 432 opposite the ends 446 and 448 of the electrodes of the fuse 440.

For example, the O-ring 450 is arranged coaxially with the axis Z402 while being pressed against the walls of the chamber 432. The O-ring 450 includes a central opening configured to allow the movable body 424 to pass when it is in its deployed position after the pyrotechnic charge 422 is tripped.

For example, the O-ring 450 is made from an elastomer material, for example from polypropylene, or PTFE, or silicone, or any other appropriate material.

Advantageously, a second O-ring 452 is arranged in the chamber 432, above the O-ring 450, coaxially with the direction Z402. The second O-ring 452 makes it possible to prevent an electrical arc from leaving the chamber 432 when the current is cut off.

Advantageously, a third O-ring 454 is arranged in the chamber 432, below the O-ring 450, coaxially with the direction Z402. When the current is cut off, the third O-ring 454 makes it possible to prevent an electrical arc from passing through the main part 16 (the latter having been pushed toward the bottom of the chamber 432 by the movable body 424 after the charge 422 is tripped).

Preferably, the O-rings 452 and 454 have a resistance greater than that of the O-ring 450, since the latter is configured to break when the conditions in the chamber require it, while the O-rings 452 and 454 must maintain the sealing of the extinguishing chamber during the operation of the circuit breaker.

For example, the O-rings 452 and 454 are made from an elastomer material, for example from PTFE or silicone, preferably from silicone filled with a mineral material, such as mica.

Advantageously, at least one vertical seal 456 in band form connects the O-rings 450, 452 and 454 by extending along the walls of the chamber 432, for example extending parallel to the direction Z402. Although only one such vertical seal 456 is visible in FIG. 4, in practice several such seals can be arranged in the chamber 432.

For example, the vertical seal 456 is made from an elastomer material, for example from PTFE or from silicone, for example silicone filled with a mineral material, such as mica, preferably from the same material as the O-rings 452 and 454.

Figure 6:
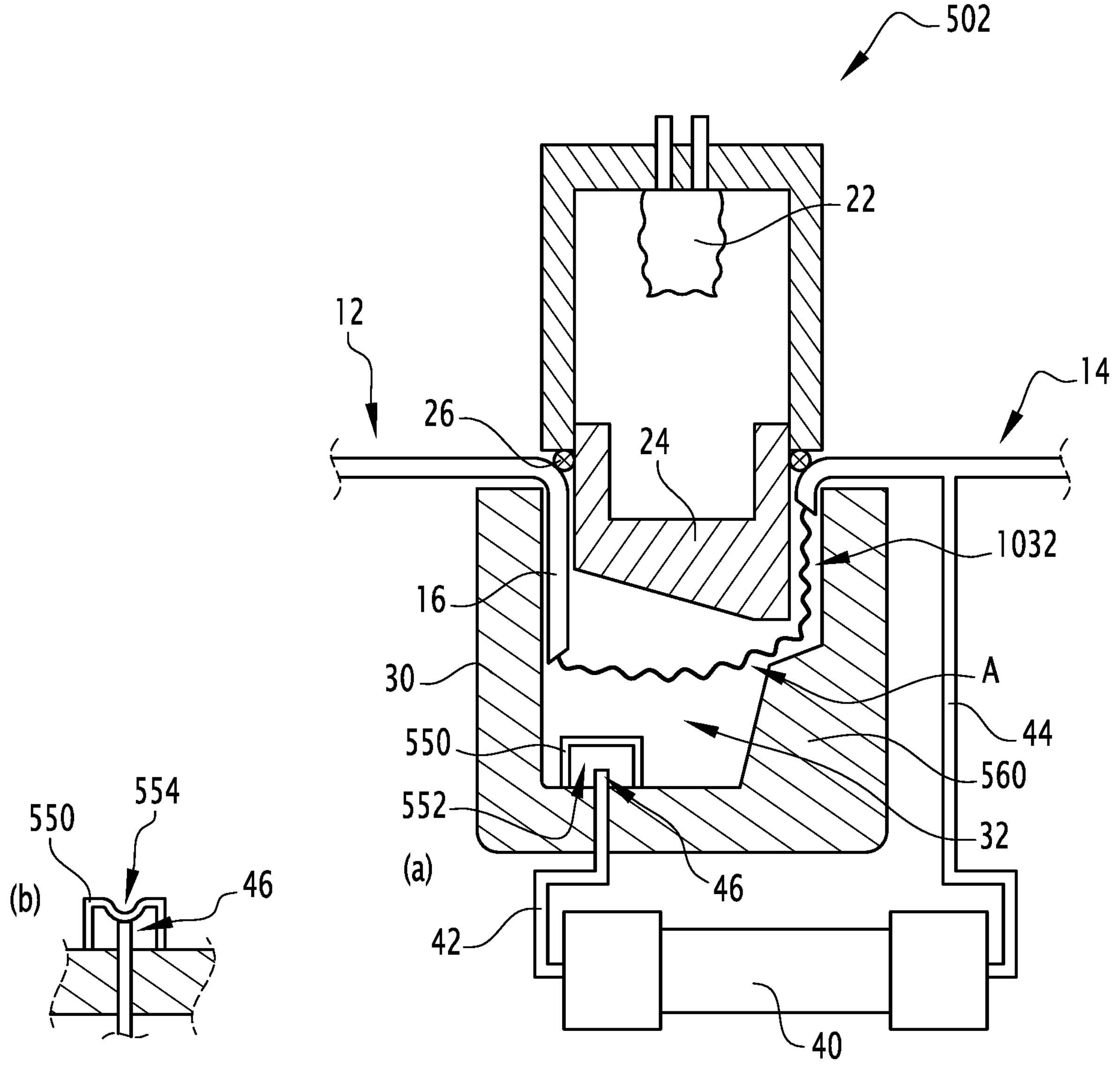
FIG. 6 is a schematic illustration, in sectional view, of an electric circuit breaker according to a fourth embodiment of the invention.

FIG. 6 shows a circuit breaker 502 according to another embodiment of the invention.

The circuit breaker 502 is similar to the circuit breaker 2, but differs from the latter in that the insulating gate includes a metal capsule 550 mounted sealably around the end 46 of the electrode 42 and which defines a volume 552 comparable to the volume 52, as illustrated by insert (a) of FIG. 6.

As long as the metal capsule 550 is intact, the electrode 42 is insulated from the rest of the chamber 32 by the air or by the vacuum contained in the volume 552.

When the pressure in the chamber 32 passes the predefined pressure threshold, the capsule 550 undergoes a deformation that forces it to come into direct contact with the electrode 42, preferably with the free end 46 of the electrode 42, at the deformation zone 554, as illustrated schematically by insert (b) of FIG. 6. In so doing, the electrode 42 is in electrical contact with the capsule 550, even if the latter is not broken, and electrical contact can be established by an electrical arc between the electrode 42 and the conductor 10.

According to another variant, the end 46 of the electrode 42 has a pointed shape and is configured to perforate the capsule 550 when the latter deforms and comes into contact with the end 46. This perforation forms an orifice in the capsule 550, by which the inside of the volume 552 is placed in communication with the rest of the chamber 32. The insulating gate is thus broken and electrical contact can be established by an electrical arc between the electrode 42 and the conductor 10.

This variant can advantageously be implemented in the case of a capsule or of a wall that is not necessarily made from metal or electrically conductive, for example in the case of a membrane or an insulating gate made from plastic.

According to another variant, the capsule 550 is configured to be broken when the pressure in the chamber 32 exceeds the predefined pressure threshold. For example, a precut is formed beforehand on one face of the capsule 550. In case of overpressure, the precut zone detaches completely or partially from the rest of the capsule, thus forming an orifice in the capsule 550, through which the inside of the volume 552 is placed in communication with the rest of the chamber 32. The insulating gate is thus broken and electrical contact can be established by an electrical arc between the electrode 42 and the conductor 10.

This variant can advantageously be implemented in the case of a capsule or of a wall that is not necessarily made from metal or electrically conductive, for example in the case of a membrane or an insulating gate made from plastic.

According to alternative embodiments that are not illustrated, the capsule 550 can be replaced by one or several metal walls.

Aside from these differences, the description of the circuit breaker 2 is applicable to the circuit breaker 502.

It should be noted that in this example, the wall 30 of the arc extinguishing chamber 32 includes a reinforcing zone 560 that protrudes from the inside of the chamber 32 to guide the electrical arc A toward a specific location of the chamber 32.

This reinforcing zone 560 is not essential and can be omitted as a variant. In alternative embodiments, one or several reinforcing zones 560 could be used in the circuit breakers according to the other embodiments described here.

Figure 7:
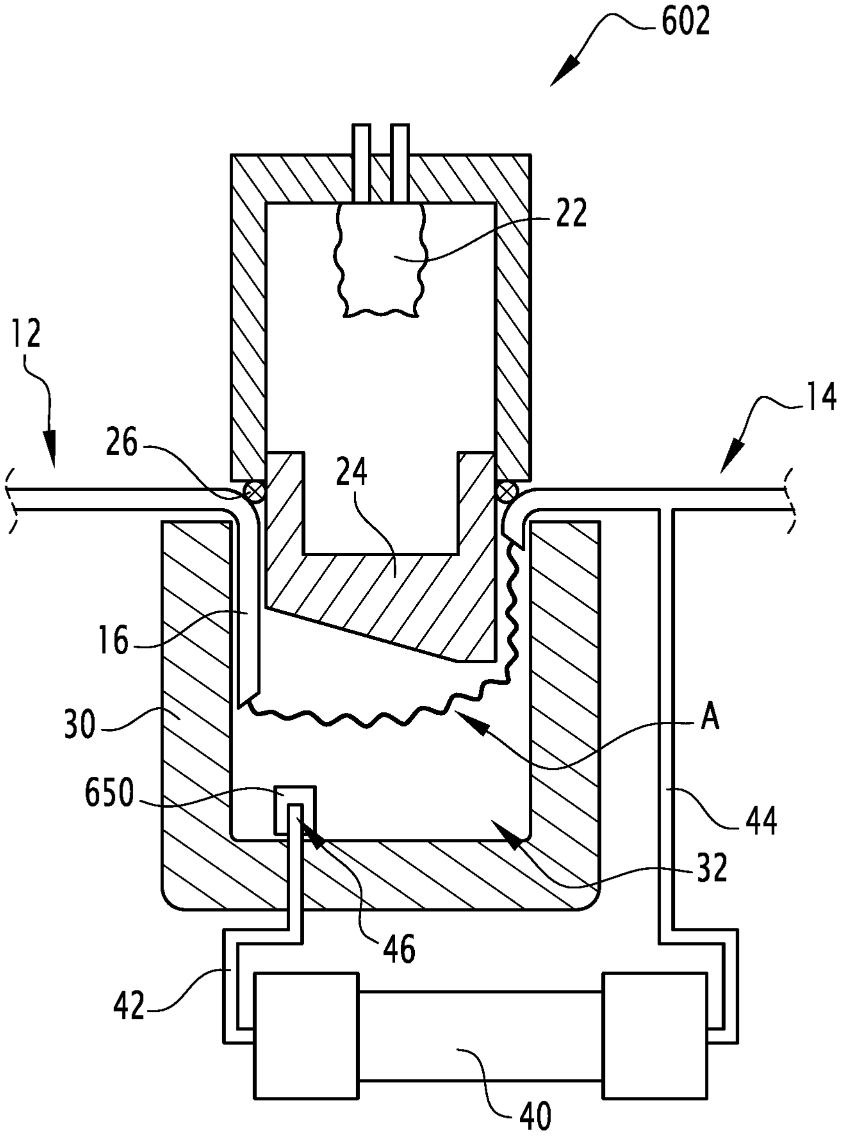
FIG. 7 is a schematic illustration, in sectional view, of an electric circuit breaker according to a fifth embodiment of the invention.

FIG. 7 shows an electric circuit breaker 602 according to another embodiment of the invention.

The circuit breaker 602 is similar to the circuit breaker 2, but differs from the latter in that the insulating gate includes an electrically insulating coating 650 deposited on the end 46 of the electrode 42 and, preferably, on the entire part of the electrode 42 that extends in the chamber 32. The coating 650 insulates the electrode 42 from the rest of the chamber 32 and prevents electrical contact from being established, even by means of an electrical arc, between the electrode 42 and the conductor 10. The coating 650 is configured to melt when the temperature in the chamber 32 exceeds a predefined temperature. By melting or sublimating, the coating exposes the electrode 42 and allows electrical contact to be established with the conductor 10.

According to examples, the coating 650 is made from polymer, for example polyamide or polypropylene or polyimide. In a variant, the coating 650 is enamel. For example, the electrode 42 is formed by connecting a portion of enameled wire to the fuse 40.

Aside from these differences, the description of the circuit breaker 2 is applicable to the circuit breaker 602.

Figure 8:
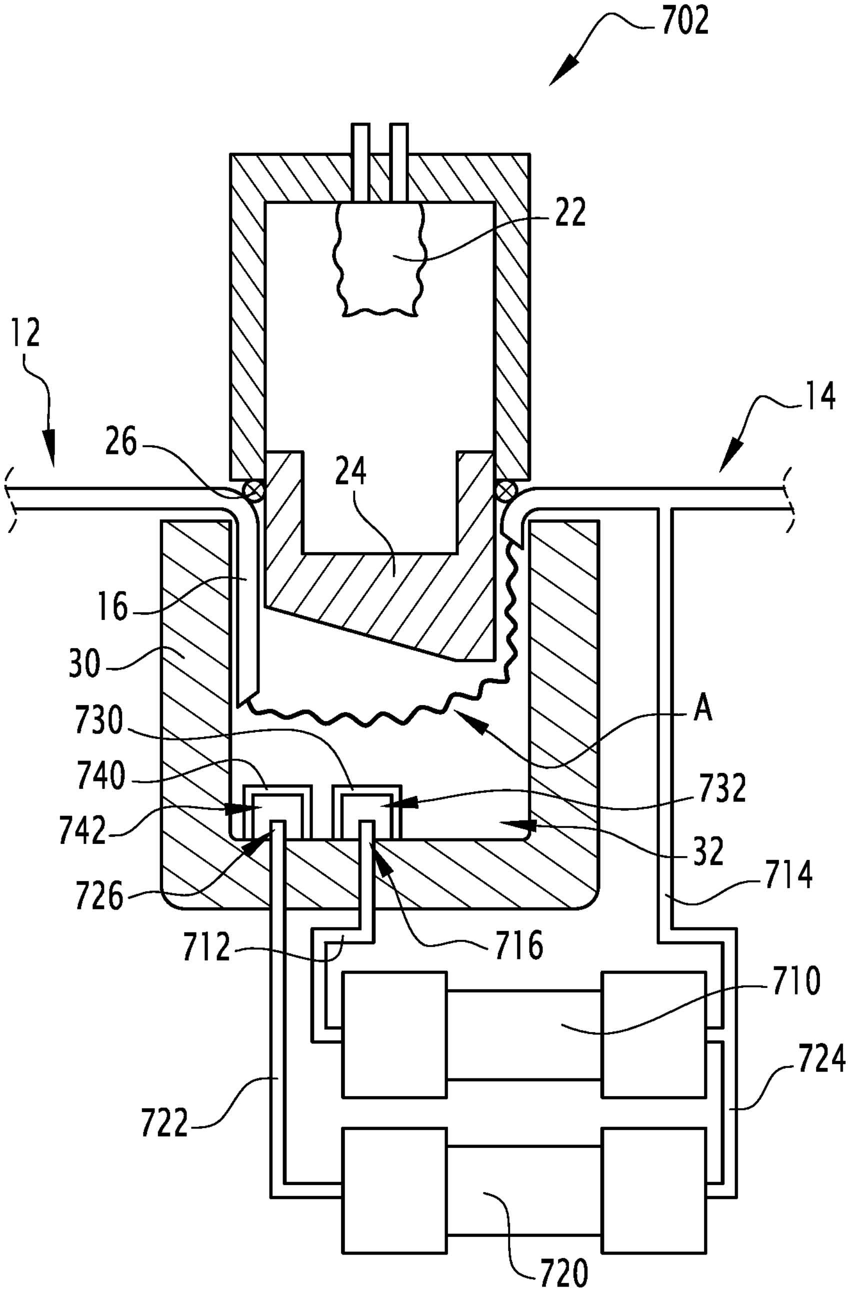
FIG. 8 is a schematic illustration, in sectional view, of an electric circuit breaker according to a sixth embodiment of the invention.

FIG. 8 shows an electric circuit breaker 702 according to another embodiment of the invention.

The circuit breaker 702 is similar to the circuit breaker 2, but differs from the latter in that it includes two fuses 710, 720 in place of the fuse 40. For example, the first fuse 710 includes a first electrode 712 that opens inside the chamber 32 and a second electrode 714 connected to the conductor 10, for example here connected to the terminal 14. Similarly, the second fuse 720 includes a first electrode 722 that opens inside the chamber 32 and a second electrode 724 connected to the conductor 10, for example here connected to the terminal 14 by means of an electrode shared with the electrode 714.

The two fuses 710 and 720 have different calibers.

For example, the fuse 710 has a current caliber of 50 A and the fuse 720 has a current caliber of 150 A.

A first insulating gate is associated with the electrode 412 of the first fuse 410 and a second insulating gate is associated with the electrode 422 of the second fuse 420. The first and second insulating gates are as previously described. For example, the first gate includes a wall 730 and a volume 732 that are similar to the capsule 550 and the volume 552. Similarly, the second gate includes a wall 740 and a volume 742 that are similar to the capsule 550 and the volume 552.

Although illustrated here in the form of capsules similar to the capsule 550, the walls 730 and 740 can be made differently. For example, they may be walls similar to the wall 50.

Advantageously, the first and second gates are configured to break under different conditions, in particular not to break at the same time. For example, the first gate is configured to break before the second gate when an electrical arc A is present after the cutoff of the conductor 10 and the temperature and/or the pressure and/or the intensity of the arc increases.

Preferably, the gate associated with the fuse 410 or 420 having the lowest current caliber of the two fuses is configured to break before the gate associated with the other fuse 410 or 420.

The embodiment of FIG. 7 can be generalized to other embodiments in which more than two fuses 410, 420 are used.

Aside from these differences, the description of the circuit breaker 2 is applicable to the circuit breaker 702.

Figure 9:
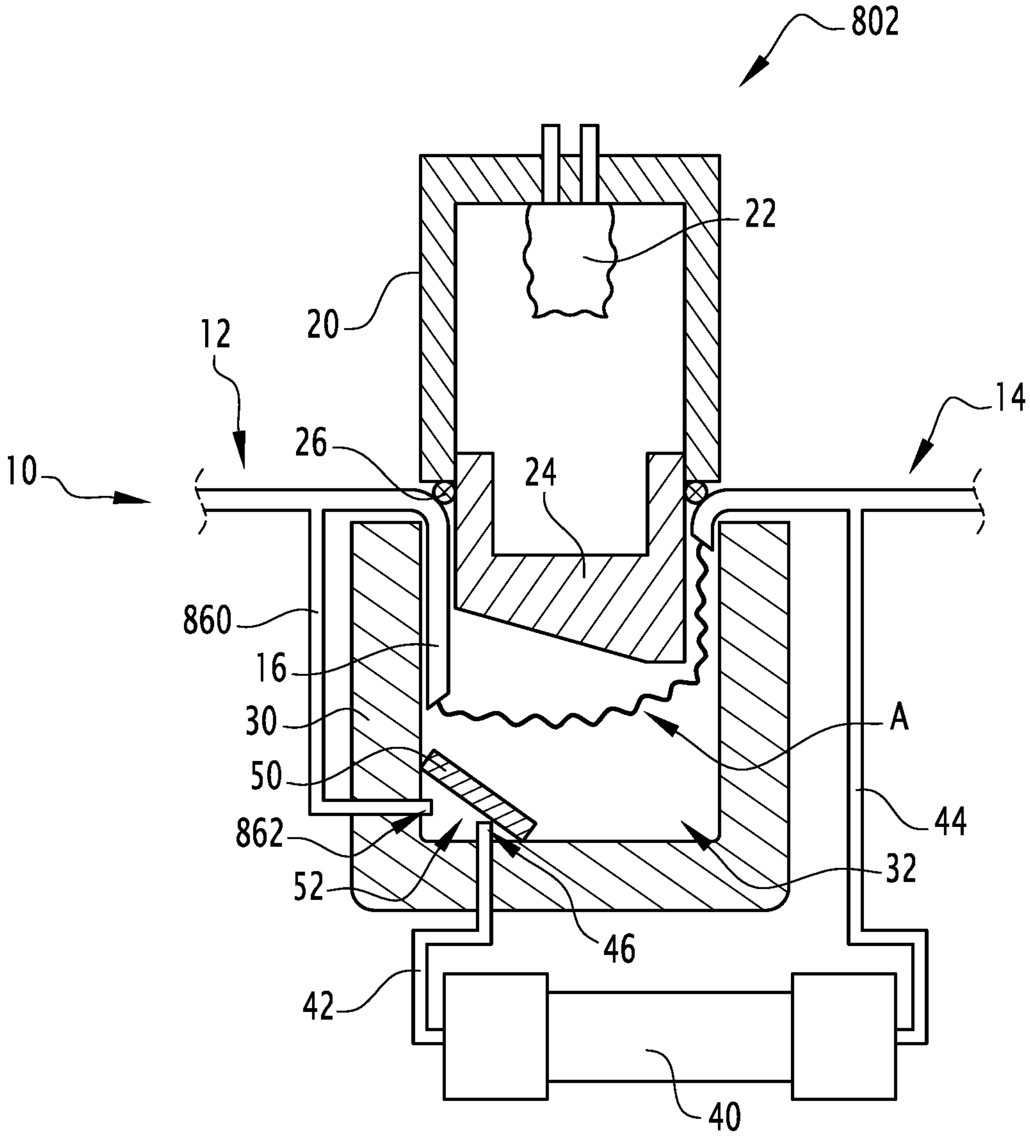
FIG. 9 is a schematic illustration, in sectional view, of an electric circuit breaker according to a seventh embodiment of the invention.

FIG. 9 shows an electric circuit breaker 802 according to another embodiment of the invention.

The circuit breaker 802 is similar to the circuit breaker 2, but differs from the latter in that it includes an additional electrical conductor 860 connected to one of the terminals of the conductor 10 (hereto the terminal 12), the additional electrical conductor 860 being insulated from the arc extinguishing chamber and including a free end 862 that opens to the inside of the volume 52 delimited by the wall 50.

For example, the additional electrical conductor 860 is formed outside the body 30 or in a wall of the body 30 (for example by overmolding).

According to embodiments given as an example, the additional electrical conductor 860 is made from tungsten.

Advantageously, the insulation distance between the end 862 of the additional electrical conductor 860 and the end 46 of the electrode 42 is chosen to allow electrical insulation in the air for an electric voltage greater than or equal to at least 1.5 times the electric voltage of the generator used in the electric circuit with which the circuit breaker 802 is associated.

Owing to the insulation distance, no electrical arc can be established between the ends 46 and 862 as long as the gate 50 has not been broken.

After the switch 22, 24 has been tripped, once the gate is broken under the effect of the electrical arc A, the volume 52 is placed in communication with the ionized atmosphere of the arc extinguishing chamber. The electrical arc can then be established between the ends 46 and 862, thereby connecting the fuse 40 to the terminal 12.

Using the additional electrical conductor 860 makes it possible to connect the fuse 40 with better reliability, since the distance between the ends 46 and 862 can be defined easily during manufacturing of the circuit breaker 802, whereas it is not always possible to precisely anticipate what the distance will be between the part 16 and the electrode 46 following the separation of the conductor 10.

According to a variant, the wall 50 can include an electrically conductive layer on its outer face, that is to say, its exposed face on the side of the chamber 32. This allows the electrical arc to be attracted close to the wall 50 more easily and to facilitate the breaking thereof by melting.

According to another optional variant, which may be combined with the preceding variant, the wall 50 can include an electrically conductive layer on its outer face, that is to say, on its face located inside the volume 52. This electrically conductive layer is then capable of ensuring electrical contact between the 2 electrodes 46 and 862 after the gate breaks.

This allows a threshold to be obtained that depends both on the temperature and the pressure, the "strongest" of these properties then triggering the breaking of the gate to cause the connection of the fuse 40.

Aside from these differences, the description of the circuit breaker 2 is applicable to the circuit breaker 802.

Figure 10:
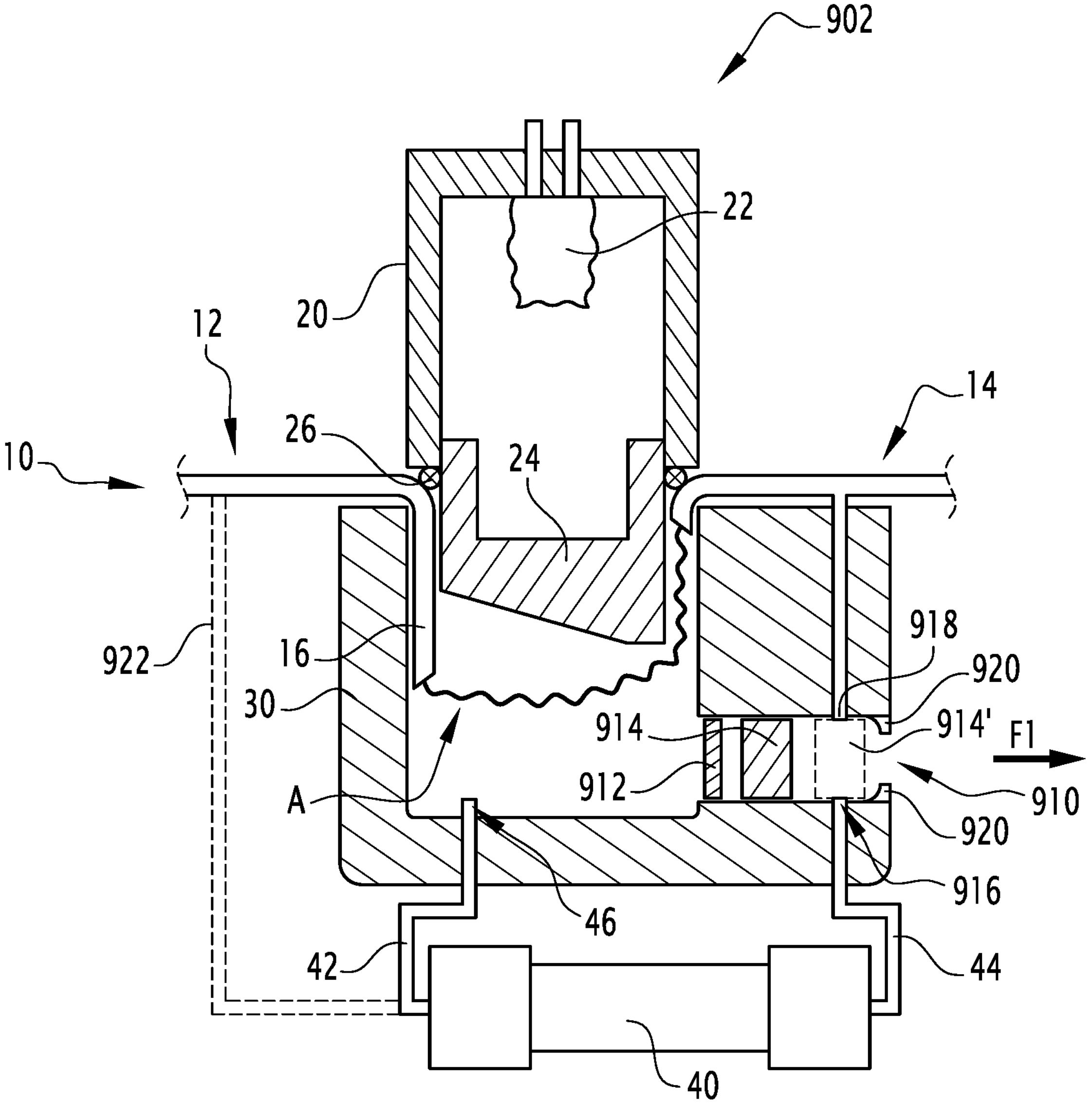
FIG. 10 is a schematic illustration, in sectional view, of an electric circuit breaker according to a eighth embodiment of the invention.

FIG. 10 shows an electric circuit breaker 902 according to another embodiment of the invention.

The circuit breaker 902 is globally similar to the circuit breaker 2, but differs from the latter by the fact that the connection device does not include a gate as previously defined that separates the end 46 from the rest of the arc extinguishing chamber.

Instead, the connection device includes a housing 910 formed in a wall of the body 30 and in which are arranged a gate 912 and an electrically conductive movable part 914, for example made from metal, mounted sliding in the housing 910.

For example, the housing 910 is a channel, preferably cylindrical, that opens outside the body 30.

The end of the electrode 44 of the fuse 40 opens in the housing 910 by its free end 916. An additional electrode is connected to the terminal 14 and opens in the housing 910 by its free end 918. For example, the ends 916 and 918 are arranged opposite one another.

The ends 916 and 918 are separated at a distance from one another, for example with an insulation distance as previously defined.

The movable part 914 can be moved between an idle position, in which it stays separated from the ends 916 and 918, and an excited position, in which it electrically connects said electrode of the fuse 40 with said terminal 14, coming into direct contact with the ends 916 and 918.

In FIG. 10, the movable part 914 is illustrated in its idle position. The position occupied by the movable part 914 in the excited position is shown by the dotted outline 914'.

The gate 912 is arranged so as to separate the arc extinguishing chamber 32 from the housing 910, for example by closing an inlet of the housing 910.

The gate 912 is configured to break when the predefined threshold in the extinguishing chamber 32 is passed.

Thus, the gate 912 can advantageously be a wall similar to the wall 50 or to the capsule 550.

Preferably, the gate 912 is configured to break when the pressure in the arc extinguishing chamber 32 passes the predefined threshold.

Once the gate is broken, the movable part 914 is moved from its initial idle position toward the excited position 914' under the effect of the pressure increase in the housing 910 caused by the placement in fluid communication with the chamber 32. In other words, the part 914 acts like a piston. This movement is illustrated by arrow F1 in FIG. 10.

For example, the part 914 has a shape complementary to the shape of the section of the housing 910.

Preferably, the part 914 is mounted in the housing 910 with zero or negative play so as to be able to remain kept in the idle position as long as the gate 912 has not been broken and it has not been moved by the pressure increase. This limits the risk of the part 914 moving accidentally toward the excited position, for example when the circuit breaker 902 is subject to an impact or a strong acceleration.

In a variant, with the same aim, the part 914 could be mechanically connected with the gate 912, for example by overmolding.

Advantageously, the housing 910 includes retaining means 920, such as one or several stops, that limit the movement of the movable part 914 to prevent it from going past the excited position 914'. Thus, the part 914 remains kept in the excited position 914'.

In alternative embodiments, although this is not drawn in FIG. 10, the circuit breaker 902 could include an additional connection device as defined in the embodiments of FIGS. 1 to 9, associated with the end 46 of the electrode 42.

According to variants, the end 46 and the electrode 42 can be omitted and replaced by an electrode 922 that directly connects the end of the fuse 40 to the terminal 12, without necessarily passing through the arc extinguishing chamber.

Aside from these differences, the description of the circuit breaker 2 is applicable to the circuit breaker 902.

In the embodiments described above, once the insulating gate is broken, the electrode 42 and the conductor 10 are placed in contact using an electrical arc A'. However, according to embodiments that are not illustrated, this connection is done directly by placing the electrode and the conductor 10 in direct contact.

For example, the electrode 42 is arranged in the chamber 32 such that the sectioned part 16 falls into contact against the wall 50 (or the capsule 550) after the conductor 10 is cut off. When the gate is broken (for example by destruction of the wall 50 or of the capsule 550), the sectioned part 16 is in direct contact with the electrode 42.

In the above embodiments, only the electrode 42 of the fuse emerges in the chamber 32. However, according to variants that are not illustrated, the other electrode 44 of the fuse could also emerge in the chamber 32. In this case, two separate electrical arcs are necessary to electrically connect the fuse 40 to the two terminals 12 and 14 of the conductor 10.

In the embodiments described above, the cutoff devices are described as an example as being associated with the electrode 42 or with the electrode 44 (and, respectively, with the terminal 12 or with the terminal 14), but it will be understood that as a variant, these cutoff devices can be used on the other electrode 44 or 42 of the fuse (and therefore on the other terminal 14 or 12), or even on both electrodes 42 and 44 at once.

Other embodiments are possible. The additional variants described hereinafter can be combined with the embodiments previously described according to any technically allowable combination.

According to one variant of the embodiment of the circuit breaker 802 illustrated in FIG. 9, the free end 862 of the additional conductor 860 can open inside the extinguishing chamber 32, while being outside the volume 52 delimited by the wall 50, the electrode 46 remaining insulated from the rest of the cutoff chamber by the membrane 50.

This arrangement allows the free end 862 to be placed freely in the extinguishing chamber 32, and thus to adapt to the geometry of this extinguishing chamber. Even if the free end 862 is then no longer insulated from the terminal 14, the electrical arc will in any case pass through the electrode 46 once the wall 50 has been broken.

The free end 862 thus being able to be placed freely, it is possible to place it at a small distance from the electrode 46, for example at less than 500 μm, so as to reduce the length of the electrical arc, and therefore to decrease the energy that this electrical arc dissipates inside the chamber 52 as well as inside the extinguishing chamber 32.

According to a variant, in particular applicable to the embodiments of FIGS. 6 and 8, the metal capsule 550 can be deformable in a bistable manner, that is to say, deformable reversibly between a first state in which the capsule is not in contact with the electrode 46, and a second state in which the electrode 46 is in direct contact with the metal capsule 550 to establish electrical conductivity.

The bistable nature of the deformation of the metal capsule can be obtained owing to a specific conformation of the upper wall of the capsule, for example owing to a curved shape, or a dome shape.

In the illustrated example, in the first state, the curved shape is distant from the electrode 46. In the second state, the curved shape is reversed and comes into contact with the electrode 46. This encourages the placement in contact with the electrode 46 and ensures a good threshold effect.

Figure 11:
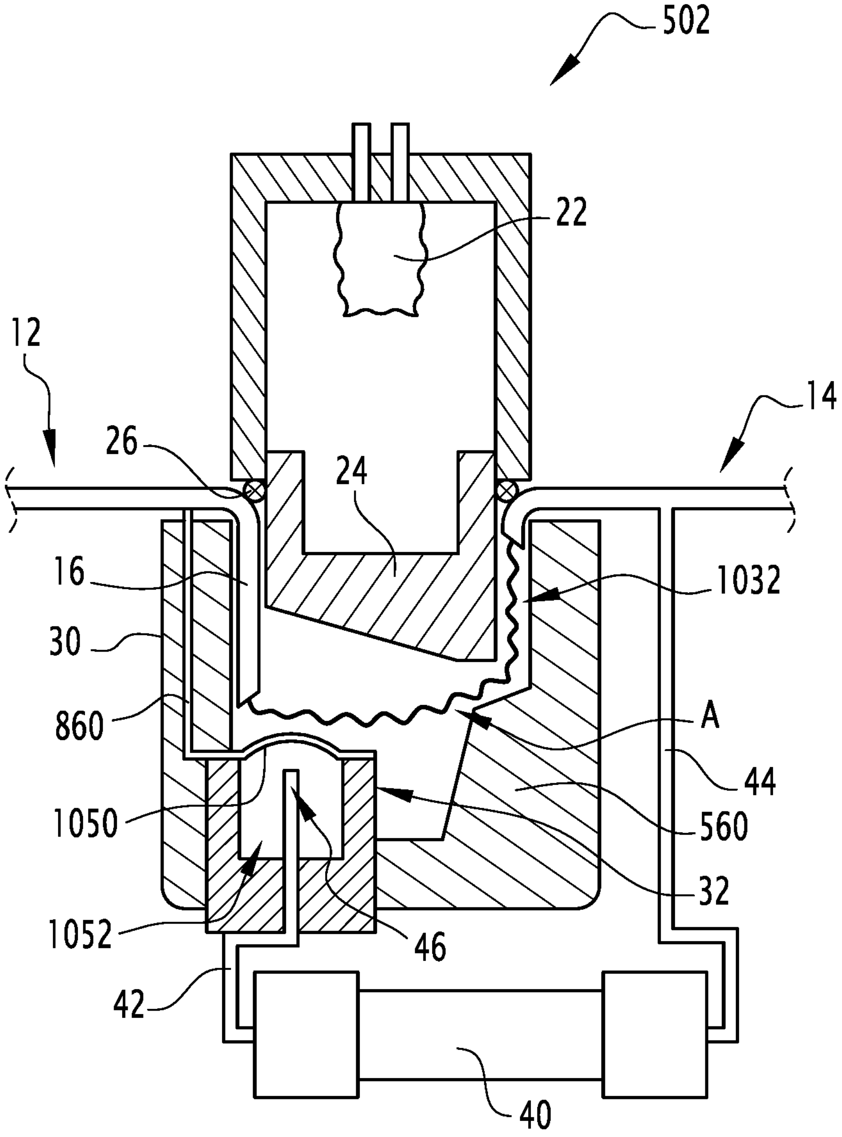
FIG. 11 is a schematic illustration, in sectional view, of the electric circuit breaker of FIG. 6 according to another embodiment.

According to one particular implementation of this variant, an example of which is illustrated by FIG. 11, the circuit breaker 502 includes an additional conductor similar to the additional conductor 860, and which connects the terminal 12 to the metal capsule, which here bears reference 1050. This procures the same advantages as those described in reference to the additional conductor 860.

According to another variant, the free end of the additional conductor may open inside the volume 1052 delimited by the capsule 1050.

According to still another variant, the additional conductor may be connected to the metal capsule even when the capsule is not deformable in a bistable manner, like the capsule 550 previously described.

According to a variant of the embodiment of the circuit breaker 902 illustrated in FIG. 10, the movable part 914 is coupled to a return member, such as a helical spring or a prestressed spring, configured to push the movable part back toward its excited position.

As long as the gate 912 is not broken, the movable part 914 stays in position in the idle position. When the gate 912 is broken, the movable part is moved toward the excited position in particular under the action of the return member.

This makes it possible to prevent the movable part 914 from completely establishing electrical contact with the ends 916 and 918 in the case where the gate has been broken but where the conditions in the extinguishing chamber are not sufficient to completely move the movable part 914.

In general, the circuit breakers according to one or several of the embodiments described above can be connected to one another, for example in series or in parallel, using their respective terminals 12, 14, to form a circuit breaker device having enhanced performance.

Figure 12:
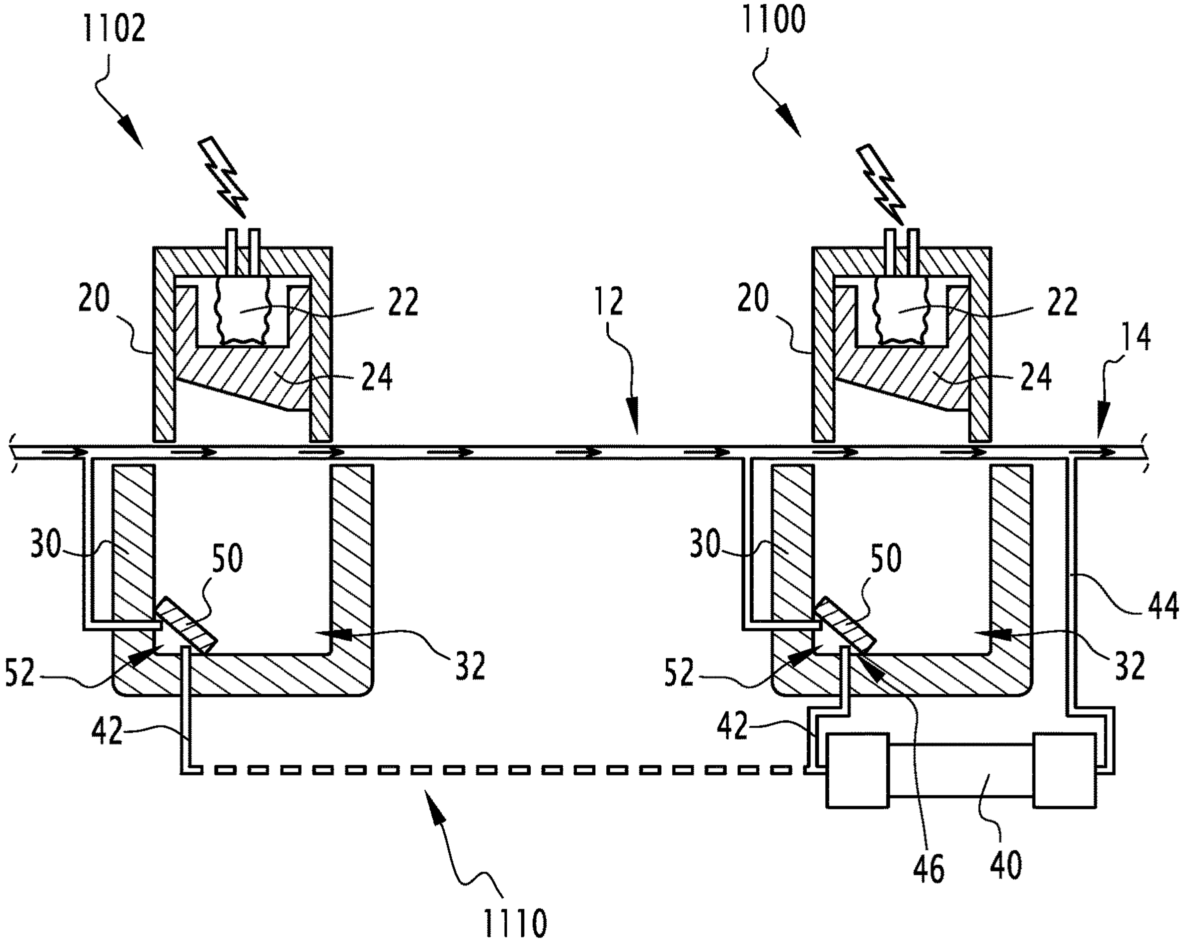
FIG. 12 is a schematic illustration of two electric circuit breakers connected in series.

According to optional embodiments, as illustrated in FIG. 12, when two circuit breakers 1100 and 1102 are connected to one another, the fuse 40 of one of the circuit breakers can be omitted and replaced by an electrical conductor 1110 connecting their respective electrodes 42.

The embodiments and variants considered above may be combined to lead to new embodiments.

The invention claimed is:

1. An electric circuit breaker, including:

an electrical conductor comprising a first terminal and a second terminal;

a switch configured to separate the first terminal from the second terminal when the switch is tripped in response to a current cutoff order;

an arc extinguishing chamber delimited by a body of the electric circuit breaker, the arc extinguishing chamber being configured to receive, after the switch is tripped, a portion of the electrical conductor separated at least from the first terminal or the second terminal;

a fuse configured to be electrically connected between the first and second terminals after the switch is tripped;

wherein the electric circuit breaker includes a connection device comprising a gate configured to be broken after the switch is tripped only when at least one of a temperature, or a pressure inside the arc extinguishing chamber, or an intensity of an electrical arc present in the arc extinguishing chamber surpass their respective predefined tripping thresholds, the connection device being configured to connect an electrode of the fuse to one of the terminals of the electrical conductor only once the gate is broken.

2. The electric circuit breaker according to claim 1, wherein at least one electrode of the fuse extends inside the arc extinguishing chamber, the gate being an electrically insulating gate that separates said at least one electrode from the rest of the arc extinguishing chamber.

3. The electric circuit breaker according to claim 2, wherein the electrically insulating gate includes a wall that delimits a volume around said at least one electrode of the fuse in the arc extinguishing chamber.

4. The electric circuit breaker according to claim 3, wherein the wall is electrically insulating.

5. The electric circuit breaker according to claim 3, wherein the wall is configured to melt when the temperature in the arc extinguishing chamber surpasses a predefined temperature tripping threshold.

6. The electric circuit breaker according to claim 3, wherein the wall includes a precut area configured to detach and to form an opening in the wall when the pressure in the arc extinguishing chamber surpasses a predefined pressure tripping threshold.

7. The electric circuit breaker according to claim 2, wherein the electrically insulating gate includes an electrically insulating coating deposited on said at least one electrode of the fuse in the arc extinguishing chamber, said coating being configured to melt when the temperature in the arc extinguishing chamber surpasses a predefined temperature tripping threshold.

8. The electric circuit breaker according to claim 3, wherein the wall or a coating on the wall is covered with at least one electrically conductive outer layer.

9. The electric circuit breaker according to claim 3, wherein the wall is made from metal.

10. The electric circuit breaker according to claim 3, wherein the wall is configured to deform when the pressure in the arc extinguishing chamber passes a predefined pressure tripping threshold, until the wall comes into contact against a free end of said at least one electrode.

11. The electric circuit breaker according to claim 10, wherein the free end of said at least one electrode is configured to perforate the wall when the wall deforms and comes into contact with said free end.

12. The electric circuit breaker according to claim 3, wherein the wall includes a precut area configured to detach and to form an opening in the wall when the pressure in the arc extinguishing chamber surpasses a predefined tripping threshold.

13. The electric circuit breaker according to claim 2, wherein the electric circuit breaker includes a control circuit, a sensor for measuring a condition inside the arc extinguishing chamber and an auxiliary actuator configured to break the electrically insulating gate and wherein the control circuit is configured to trip the auxiliary actuator when a physical property measured by the sensor passes a threshold value.

14. The electric circuit breaker according to claim 1, wherein the electric circuit breaker includes an additional fuse configured to be electrically connected between the first and second terminals after the switch is tripped, at least one electrode of the additional fuse extending inside the arc extinguishing chamber, the electric circuit breaker further including an electrically insulating additional gate that separates said electrode of the additional fuse from the rest of the arc extinguishing chamber, said additional gate being configured to be broken after the switch is tripped only when at least one of the temperature, or the pressure inside the arc extinguishing chamber, or the intensity of an electrical arc present in the arc extinguishing chamber surpass their respective predefined tripping thresholds, these tripping thresholds being different from the tripping thresholds associated with the electrically insulating gate of the other fuse.

15. The electric circuit breaker according to claim 3, wherein the electric circuit breaker includes an additional electrical conductor connected to one of the terminals of the electrical conductor, the additional electrical conductor being insulated from the arc extinguishing chamber and including a free end that opens to the inside of the volume delimited by the wall.

16. The electric circuit breaker according to claim 1, wherein the connection device includes an electrically conductive movable part that is movable between an idle position and an excited position in which the movable part electrically connects said electrode of the fuse with said terminal, the movable part being mounted sliding in a housing of the electric circuit breaker, the gate being arranged so as to separate the arc extinguishing chamber from the housing and being configured to break when at least one of the predefined tripping thresholds is surpassed.

17. The electric circuit breaker according to claim 1, wherein the switch is a pyrotechnic switch.

* * * * *